United States Patent [19]

Sano

[11] 4,159,868
[45] Jul. 3, 1979

[54] FILM LOOP FORMING DEVICE

[75] Inventor: Kotaro Sano, Kodaira, Japan

[73] Assignee: Nihon Beru-Haueru Kabushiki Kaisha (Bell & Howell Japan, Ltd.), Higashimurayama, Japan

[21] Appl. No.: 921,671

[22] Filed: Jul. 3, 1978

[30] Foreign Application Priority Data

Jul. 4, 1977 [JP] Japan .............................. 52-87596[U]

[51] Int. Cl.² ........................................... G03B 31/00
[52] U.S. Cl. ....................................... 352/14; 352/12; 352/27; 226/44
[58] Field of Search ............... 352/12, 14, 27; 226/44, 226/45

[56] References Cited

U.S. PATENT DOCUMENTS

| 3,942,882 | 3/1976 | Saito | 352/14 |
| 3,982,826 | 9/1976 | Saito | 352/14 |

FOREIGN PATENT DOCUMENTS 2352890  5/1974  Fed. Rep. of Germany ............. 352/14

Primary Examiner—Monroe H. Hayes
Attorney, Agent, or Firm—John H. Moore; Roger M. Fitz-Gerald

[57] ABSTRACT

A film loop size control is described for use in a camera in which the film is advanced intermittently past an image recording station by a first drive means and advanced continuously past a sound recording station by a second drive means. A detector which senses the size of the film loop between the image recording station and the sound recording station causes a control means to actuate only the second drive means whenever the detector senses a slack film loop when the film is stationary. The second drive means then advances the film past the sound recording station to remove the slack from the film loop. When the detector senses an absence of slack in the film, the control means de-actuates the second drive means. A switch is included which is adapted to be actuated when the film slack has been reduced for actuating both the first and the second drive means for advancing the film past the image recording station and the sound recording station.

8 Claims, 2 Drawing Figures

FILM LOOP FORMING DEVICE

BACKGROUND OF THE INVENTION

This invention relates generally to motion picture cameras which record sound as well as images, and particularly to control devices in such cameras for synchronizing the recording of sound with the recording of images.

In motion picture cameras of the type under consideration, the film is transported past an aperture gate typically by a shuttle tooth which reciprocates for advancing the film past the aperture a frame at a time. Downstream of the image recording station, a sound recording station is included at which a capstan drive advances the film past a recording head at a constant speed. In order to permit the film to move intermittently past the aperture gate while moving continuously past the recording head, a film loop is developed between the image recording station and the sound recording station to absorb the intermittent motion of the film. If the rate at which the film moves past the aperture gate is equal to the rate at which the film moves past the recording head, the size of the film loop remains constant. However, should the film move past the aperture gate faster than it moves past the recording head, the size of the film loop will increase and synchronization between the recording of images and the recording of sound may be degraded.

If excessive slack exists in the film movement when the camera is stopped, when the camera is restarted the sound may be recorded irregularly on the film until the slack has been reduced by the rotation of the capstan drive. Such irregular recording of the sound becomes more pronounced when the camera is adapted to record images a single frame at a time. For example, in recording animations, a camera typically records an image on a single frame, the camera is stopped while the object is repositioned, and another single frame is recorded. This process is repeated until the animation is completed. However, each time the camera is stopped, excessive slack may appear in the film loop and, because the images are only recorded a single frame at a time, synchronization between the rate at which the film moves past the aperture gate and the rate it moves past the record head is never fully achieved.

Although prior film control devices do synchronize the speed of the film past the aperture gate with the speed of the record head once recording is in progress, those devices do not remove the slack from the film prior to recording so that the images and sound are always in synchronism.

OBJECTS OF THE INVENTION

Accordingly, it is an object of this invention to provide an improved film loop size control which overcomes the deficiencies of the prior art.

It is a more specific object of the invention to provide a film loop size control which removes slack from the film loop prior to recording, particularly for use in cameras in which images are recorded a single frame at a time.

SUMMARY OF THE INVENTION

As indicated above, the invention finds use in a camera which records sounds and images and wherein the film is advanced intermittently past an image recording station by a first drive means such as a shuttle drive motor, and wherein the film is advanced continuously past a sound recording station by a second drive means such as a capstan motor. A detector which senses the size of the film loop between the image recording station and the sound recording station causes a control means to actuate only the second drive means whenever the detector senses a slack film loop when the film is stationary. The second drive means then advances the film past the sound recording station to remove the slack from the film loop. When the detector senses an absence of slack in the film, the control means de-actuates the second drive means. A switch is included which is adapted to be actuated when the film slack has been reduced for actuating both the first and the second drive means for advancing the film past the image recording station and the sound recording station. Thus, the slack from the film loop is removed prior to recording and synchronism is maintained between the film at the image recording station and the film at the sound recording station.

BRIEF DESCRIPTION OF THE FIGURES

The objects stated above and other objects of the invention are more particularly set forth in the following detailed description and in the accompanying drawings of which.

DESCRIPTION OF THE PREFERRED EMBODIMENT

Figure 1:
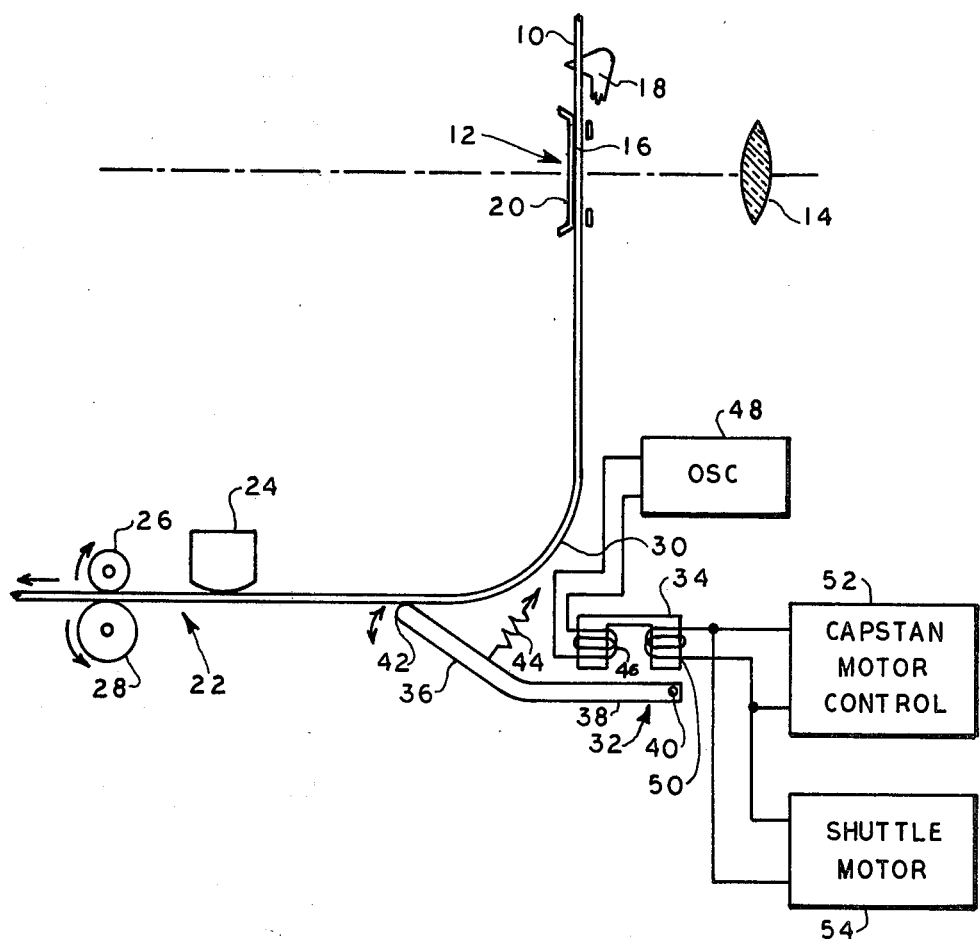
FIG. 1 is a schematic illustration of a film transport for a sound and image recording camera and a control device for removing slack from the film loop and for controlling the size of the loop.

Referring now to FIG. 1, there is shown a portion of a sound recording camera incorporating the invention. As shown, the film 10 is transported past an image recording station 12 at which light passes through a lens 14 for exposing a portion 16 of the film. The film is transported past the image recording station 12 by a shuttle 16 which is reciprocated by a shuttle drive motor (not shown) in a manner well known in the art such that the shuttle 16 repeatedly engages perforations in the film 10 and pulls the film 10 downwardly to the image exposure station 12. A pressure plate 20 is also disposed at the image recording station for holding the film 10 flat for properly recording images which are focused on the film by the lens 14.

By virtue of the operation of the shuttle 18, the film is transported, one frame at a time, to the image recording station 12, and each frame is momentarily held at that station while the image is recorded. This results in an intermittent feeding of the film downwardly a frame at a time.

Downstream of the image recording station 12 there is a sound recording station 22 at which a sound recording head 24, a capstan 26 and a pinch roller 28 are located. A capstan drive motor (not shown in FIG. 1) drives the capstan 26 at a constant angular velocity for advancing the film at a substantially constant linear speed past the recording head 24 for recording sound on the film 10 in synchronism with the recording of images on the film at the image recording station 12.

As is well known in the art, a film loop 30 is developed between the image recording station 12 and the sound recording station 22 to facilitate the conversion of intermittent film motion to continuous film motion.

To insure synchronization between the image and sound recording, the size of the film loop 30 is maintained constant by synchronizing the speed of the shuttle drive motor to the speed of the capstan motor. For this purpose, there is provided a film loop slack sensing means 32 disposed between the image recording station 12 and the sound recording station 22 for sensing the size of the film loop 30. The sensing means 32 includes a core 34 and a pivotable loop size detector 36, the latter of which has a first end 38 for rotating about a pivotal connection 40 and a second end 42 for engaging the film. To urge the end 42 into contact with the film, a spring 44 biases the end 42 of the loop size detector 36 so that, when the size of the loop 30 decreases, the detector 36 rotates clockwise about the pivotal connection 40. When the size of the loop 30 increases, the pressure of the film against the end 42 urges that end downwardly so that the detector 36 pivots in a counter-clockwise direction about the pivotal connection 40.

To convert the motion of the detector 36 to a control signal, the core 34 includes a first winding 46 which is coupled to a high frequency oscillator 48 and a second winding 50 which is coupled to a capstan motor control 52 and to a shuttle motor control 54. As is described in more detail hereinafter, the motion of the detector 36 results in a change in the spacing between the core 34 and the detector 36 so that the inductance associated with core 34 and its windings 46 and 50 is correspondingly changed for synchronizing the speed of the shuttle motor with the speed of the capstan motor and for selectively reducing the size of the film loop 30.

Figure 2:
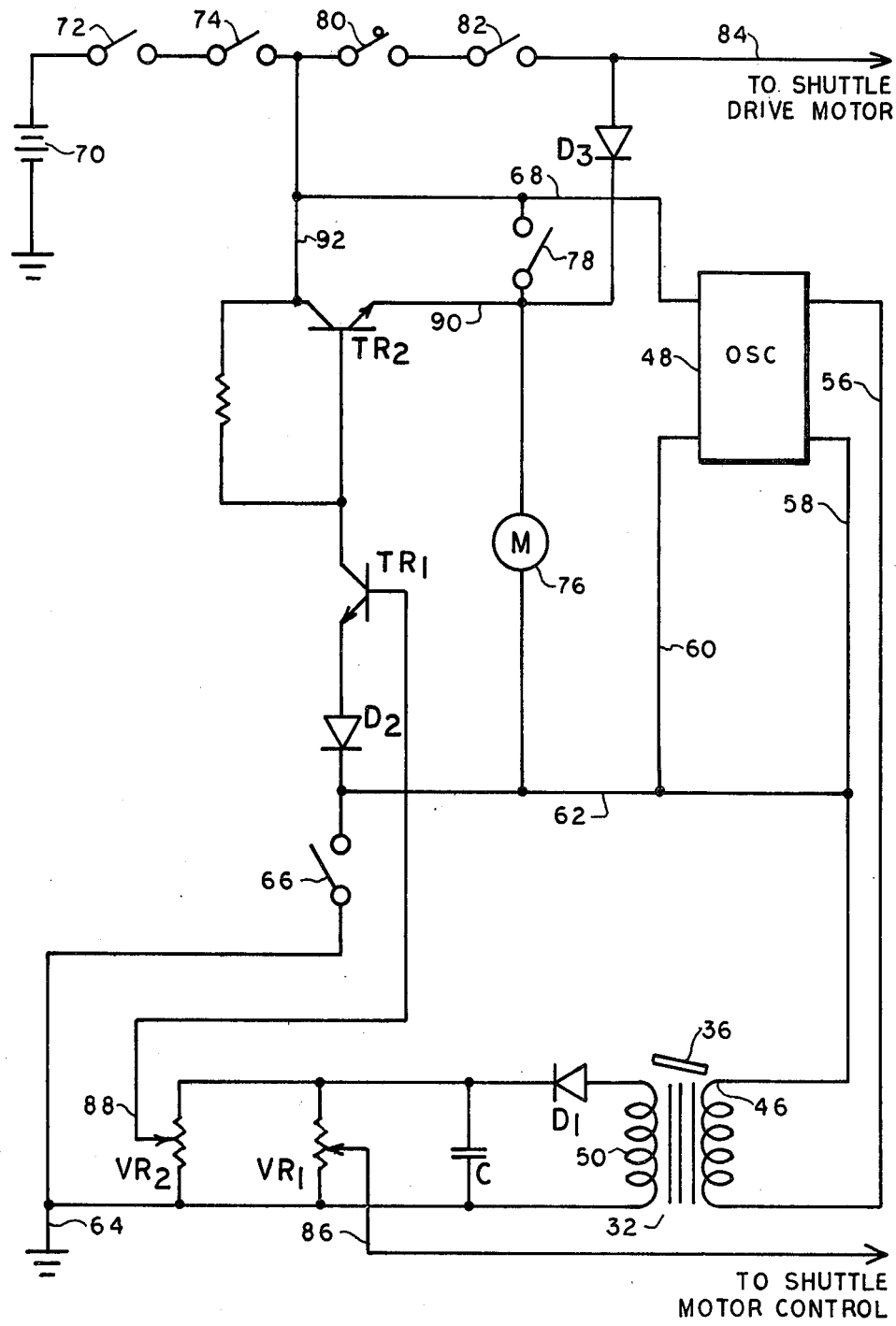
FIG. 2 is a more detailed circuit diagram of the film loop control shown in FIG. 1.

Referring now to FIG. 2, there is shown the oscillator 48, the sensing means 32, and details of the motor control 52. The combination illustrated in FIG. 2 serves as a control means which is responsive to the detector 36 sensing a slack film loop when the film is stationary for actuating the capstan drive to reduce the slack in the film loop, and for then de-actuating the capstan drive when the slack in the film loop has been reduced. Switch means, described in more detail hereinafter, is adapted to be actuated when the film slack has been reduced as described above for actuating the capstan drive and the shuttle drive for advancing the film past the image recording station and the sound recording station for recording images and sound on the film. By reducing the slack in the film prior to the recording of images and sound, synchronism is maintained between the film at the image recording station and the film at the sound recording station.

As shown, the oscillator 48 supplies high frequency energy to the coil 46 via leads 56 and 58. The oscillator 48 also includes a lead 60 coupled to a common lead 62 which is adapted to be connected to ground lead 64 when a switch 66 is closed. The latter switch is adapted to be closed whenever a sound film cartridge is inserted in the camera.

Another lead 68 couples the oscillator 48 to a source of power such as battery 70 via a main switch 72 and a pre-run switch 74. Thus, when main switch 72, pre-run switch 74 and the cartridge switch 66 are closed, the battery 70 is applied across the oscillator 48 for powering the sensing means 32.

A capstan drive motor 76 is shown coupled between common lead 62 and one end of a switch 78, the latter of which is opened when the camera is to be used for single frame shooting and which is closed when the camera is to be used for continuous shooting. The other end of the switch 78 is coupled to the lead 68 so that when switches 66, 72, 74 and 78 are closed, power is applied to the capstan drive motor 76.

To supply power to the shuttle drive motor (not shown) a trigger switch 80 and another switch 82 are coupled between the pre-run switch 74 and a lead 84 which is coupled to the shuttle drive motor. Hence, all four of the switches 72, 74, 80 and 82 must be closed in order to power the shuttle drive motor. Preferably, when the switch 80 closes it energizes a solenoid for closing the switch 82. In addition, the pre-run switch 74 and trigger switch 80 are preferably constructed to be a single, two-step pressure sensitive switch such that when the two-step switch is pressed slightly, only the pre-run switch 74 closes. When the two-step switch is pressed fully, the trigger switch 80 also closes.

In order to generate a signal for energizing the capstan motor 76 prior to the energization of the shuttle drive motor to remove slack from the film loop, the coil 50 is coupled through a diode D1 to a capacitor C which stores a voltage corresponding to the inductance associated with the sensing means 32. Thus, as the detector 36 pivots about the pivotal connection 40, and moves closes to or farther from the sensing means 32, the latter's inductance will change and the voltage on the capacitor C will change. As will be shown, the voltage on the capacitor C is used to control the motor 76 for removing slack in the film loop.

Coupled in parallel with the capacitor C is a first variable resistor VR1 whose center tap 86 is coupled to the shutter motor control 54. A second variable resistor VR2 is connected in parallel with VR1 and has a center tap 88 which is coupled to the base of a transistor TR1. The emitter of the transistor TR1 is coupled through a diode D2 to the common lead 82. The collector of the transistor TR1 is coupled to the base of another transistor TR2, the emitter of the latter being coupled via a lead 90 to the connection between the capstan drive motor 76 and the switch 78. The collector of the transistor TR2 is coupled via lead 92 to a connection between the switches 74 and 80.

Assuming that a sound cartridge has been inserted in the camera, and that the camera is to be used for single frame shooting the switch 66 will be closed and the switch 78 will be open. With the main switch 72 closed, the camera is in condition to be operated.

When the operator lightly engages the two-step switch for closing the switch 74, power is applied to the oscillator 48 for energizing the coil 46. Assuming that there is slack in the film loop, the detector 36 will be moved closer to the sensing means 32 so that the inductance of the latter is reduced and the voltage on the capacitor C is lowered. The lower voltage across the capacitor C lowers the bias on the base of the transistor TR1 and renders it non-conductive. Hence, the voltage at the collector of the transistor TR1 rises and causes the transistor TR2 to conduct. In this condition, current to the capstan drive motor flows through the main switch 72, the pre-run switch 74 and the transistor TR2, whereby the capstan drive motor 76 rotates the capstan for advancing the film and reducing the slack in the film loop.

When the slack in the film loop is removed, the detector 36 moves to its normal position whereupon the inductance of the sensing means 32 is raised and the voltage across the capacitor C is raised correspondingly. This causes the transistor TR1 to conduct and to turn off transistor TR2. Hence the capstan drive motor 76 is now de-energized. The point at which the transistor TR1 turns on and off may be adjusted by varying the center tap 88 on the variable resistor VR2.

When the two-step switch is pressed fully, switches 80 and 82 are closed and power is applied to the shuttle drive motor. Simultaneously, power is applied to the capstan drive motor 76 via the diode D3. Hence, the film is now moved by a single frame past the aperture gate and the capstan 26 advances the film past the record head 24. When a single frame of the film has been shot, the switch 82 is opened by the solenoid control referred to above, thereby de-energizing both the shuttle drive motor and the capstan drive motor 76.

If the stopping of the film after one frame has been shot causes additional slack in the film loop, the same process as explained above is repeated again by turning on the pre-run switch 74 just before the single frame shooting is done. This will again energize the capstan drive motor 76 until the slack has been removed, whereupon the transistor TR2 will become non-conductive and the capstan drive motor will be de-energized. Further pressure on the two-step switch results in the closure of switch 82 so that both the shuttle drive motor and the capstan drive motor 76 are again energized for the shooting of a single frame film. This process continues repeatedly as each frame of film is shot.

When continuous film shooting is desired, the switch 78 is closed to thereby bypass the transistors TR1 and TR2 so that the latter have no effect on the operation of the capstan drive motor 76. In this circumstance, closure of the main switch 72 and the pre-run switch 74 provides power to the capstan drive motor 76 through the switch 78. Upon closure of the trigger switch 80 and the switch 82, power is also applied to the shuttle drive motor for advancing the film past the aperture gate.

Should the sensing means 32 detect a difference between the rate at which the film is moved past the image generated station and the rate at which the film is moved past the sound recording station, the size of the loop will vary and the sensing means 32 will cause a voltage to be generated at the center tap 86 of the resistor VR1 for application to the shuttle motor control 20. Hence, the speed of the shuttle drive motor is synchronized to the speed of the capstan drive motor 76 so as to remove any slack from the film loop. The point at which the shuttle motor control becomes effective may be adjusted as desired by varying the center tap 86 on the variable resistor VR1.

In the embodiment described immediately above, the pre-run switch 74 and the trigger switch 80 are preferably formed as a two-step switch. However, it will be understood that the pre-run switch 74 may be constructed to work independently of the switch 80. Moreover, the pre-run switch 74 may be constructed so that it is constantly closed so as to remove the slack of the film automatically whenever the main switch 72 is closed.

In accordance with the objects of the invention, the embodiment described above removes undesirable slack from the film loop. This feature is particularly advantageous when used in a motion picture camera adapted to shoot film a single frame at a time. Moreover, synchronism between the recording of images and the recording of sound is obtained by using the sensing means not only to operate the circuitry for removing slack but also for driving the shuttle motor control.

Although the invention has been described in terms of a specific embodiment, it will be obvious to those skilled in the art in light of this disclosure that many alterations and modifications may be made to the described embodiment. All such alterations and modifications are deemed to be within the spirit and scope of the invention as defined by the appended claims.

What is claimed is:

1. In a camera for recording sound and images wherein the film is advanced intermittently past an image recording station by a first drive means and advanced at a constant speed past a sound recording station by a second drive means, and wherein a detector senses the size of a film loop developed between the image recording station and the sound recording station, a film loop size control, comprising:

control means responsive to the detector sensing a slack film loop when the film is stationary for actuating only the second drive means to reduce the slack, and responsive to the detector sensing an absence of slack in the film for de-actuating the second drive means; and switch means adapted to be actuated when the film slack has been reduced for actuating both the first and second drive means for advancing the film past the image recording station and the sound recording station for recording of images and sound on the film, whereby synchronism is maintained between the film at the image recording station and the film at the sound recording station by the removal of slack in the film loop prior to advancing the film for the recording of images thereon.

2. A film loop size control as set forth in claim 1 further including means for varying the speed of said first drive means in accordance with variations in the size of the film loop for maintaining synchronization between the speeds of the first and second drive means while the latter are both actuated.

3. A film loop size control as set forth in claim 1 wherein said detector is adapted to engage the film loop and to move as the size of the film loop varies, wherein said control means includes a coil adapted to receive high frequency energy and disposed in proximity to said detector such that the inductance of said coil varies with the position of said detector, and wherein said control means includes means responsive to the inductance of said coil assuming a value representative of a slack film loop for actuating said second drive means.

4. A film loop size control as set forth in claim 3 including a pre-run switch which, when closed, powers said control means for eliminating slack in the film loop and a second switch adapted to be closed subsequent to the closure of said pre-run switch for powering said first drive means.

5. A film loop size control as set forth in claim 4 wherein said second switch is adapted to apply power also to said second drive means so as to release said control means from control over said second drive means, whereby, after the slack has been removed from the film loop, said first and second drive means are powered from the same power source.

6. In a camera for recording sound and images wherein the film is advanced intermittently past an image recording station by a shuttle drive motor and advanced at a constant speed past a sound recording station by a capstan drive motor, and wherein a movable detector engages and follows a loop of film developed between the image recording station and the sound recording station, a film loop size control, comprising:

an oscillator;

a pre-run switch coupled between a power source and said oscillator for applying power to the oscillator when said pre-run switch is closed;

a coil adapted to receive energy from said oscillator and disposed in proximity to the detector such that the inductance of the coil varies with the position of the detector;

means responsive to the inductance of said coil being of a first value when the position of the detector as indicative of slack in the film loop for actuating the capstan drive motor to reduce the slack, and responsive to the inductance of said coil being of a second value when the position of the detector is indicative of reduction in the slack in the film loop for de-actuating the capstan drive motor;

a second switch serially coupled with the pre-run switch and adapted to couple the power source to both the capstan drive motor and the shuttle drive motor when both of said switches are closed, whereby, upon closure of said pre-run switch, any slack in the film loop is detected and the capstan drive motor is actuated to reduce the slack so that, upon closure of said second switch, both motors are powered and the film is advanced past the image recording station in synchronism with the advance of film past the sound recording station.

7. A film loop size control as set forth in claim 6 including a control for varying the speed of the shuttle drive motor in response to variations in the inductance of said coil to synchronize the speed of the shuttle drive motor with the speed of the capstan drive motor.

8. A film loop size control as set forth in claim 6 further including a third switch having a first position for single frame image recording and a second position for continuous image recording, said third switch being connected in circuit with said capstan drive motor such that when said third switch is in its first position, the capstan drive motor is controllable by said actuating means, and when said third switch is in its second position, the actuating means is bypassed and the capstan drive motor is energized by the closure of said pre-run switch for removing slack from the film loop prior to the energization of the shuttle drive motor.

* * * * *